United States Patent
Beig et al.

[11] 3,894,443
[45] July 15, 1975

[54] TRANSMISSION GEAR SHIFT CONTROL MECHANISM FOR HEAVY VEHICLES

[75] Inventors: Willi Beig; Fritz Feller, both of Friedrichsahfen, Germany

[73] Assignee: Zahnradfabrik Friedrichshafen, Aktiengesellschaft, Friedrichshafen, Germany

[22] Filed: Mar. 22, 1973

[21] Appl. No.: 343,698

[30] Foreign Application Priority Data
Apr. 1, 1972 Germany............................ 2215994

[52] U.S. Cl. .................... 74/476; 74/477; 74/878
[51] Int. Cl. ............................................. F16h 57/06
[58] Field of Search .............. 74/475, 476, 477, 878

[56] References Cited
UNITED STATES PATENTS

| | | |
|---|---|---|
| 2,493,592 | 1/1950 | Peabody .............................. 74/878 |
| 2,785,584 | 3/1957 | Hambleton ........................... 74/878 |
| 2,924,124 | 2/1960 | Froslie ............................. 74/475 X |
| 3,242,758 | 3/1966 | Harris et al. ......................... 74/476 |
| 3,250,142 | 5/1966 | Schuster et al. ................... 74/475 X |
| 3,533,301 | 10/1970 | Hausinger ........................ 74/476 X |

*Primary Examiner*—Samuel Scott
*Assistant Examiner*—John Reep

[57] ABSTRACT

A first locking mechanism prevents continuous displacement of a speed control gear shift lever through a plurality of operative positions in a down-shift direction while a second locking device prevents displacement of a directional control lever from a neutral position when vehicle speed is excessive. The second locking device is momentarily released by selective actuation of a push button switch wile the first locking device is momentarily released in response to initial displacement of the speed control lever. Also, in response to excessive engine speed, shifting operation is prevented.

24 Claims, 12 Drawing Figures

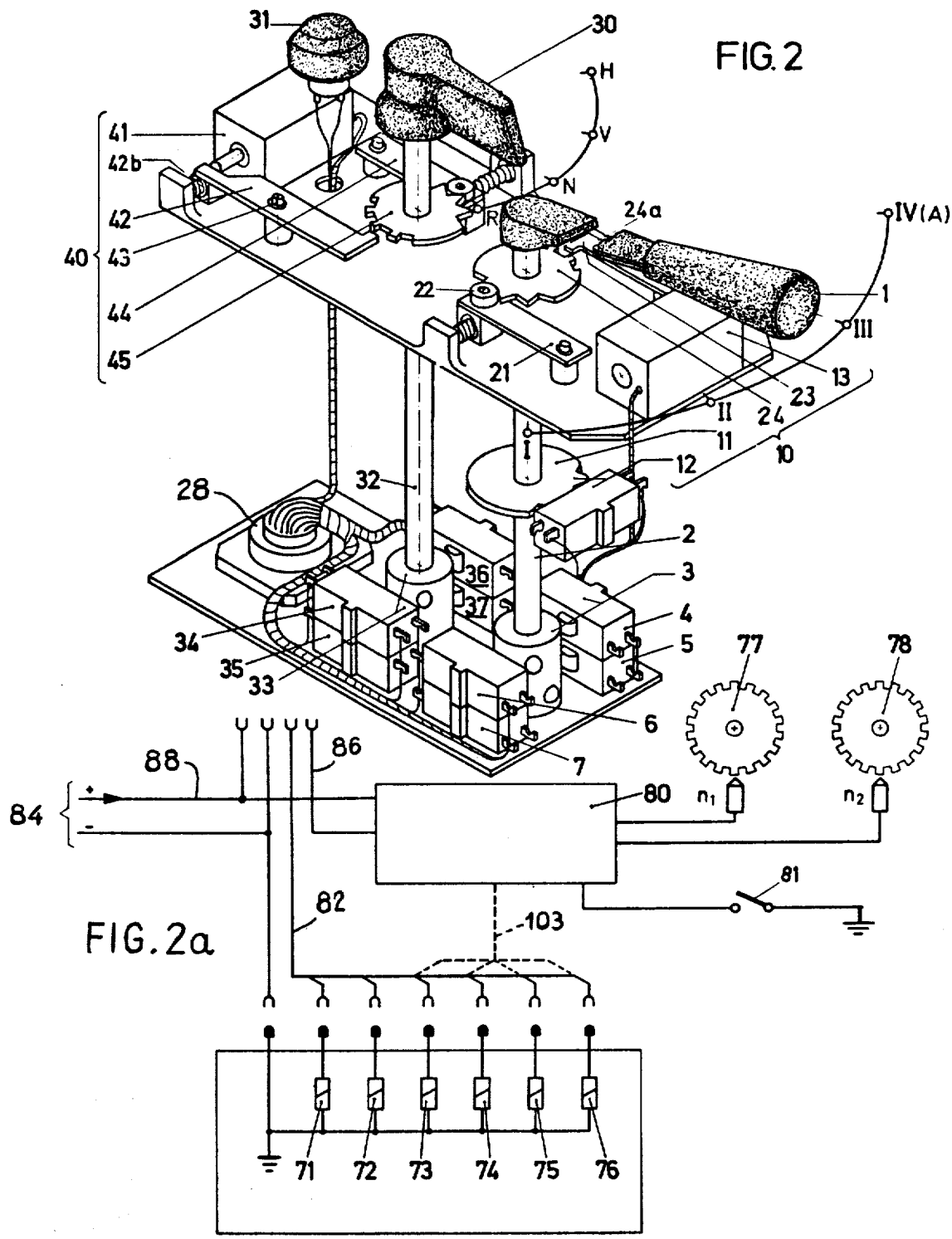

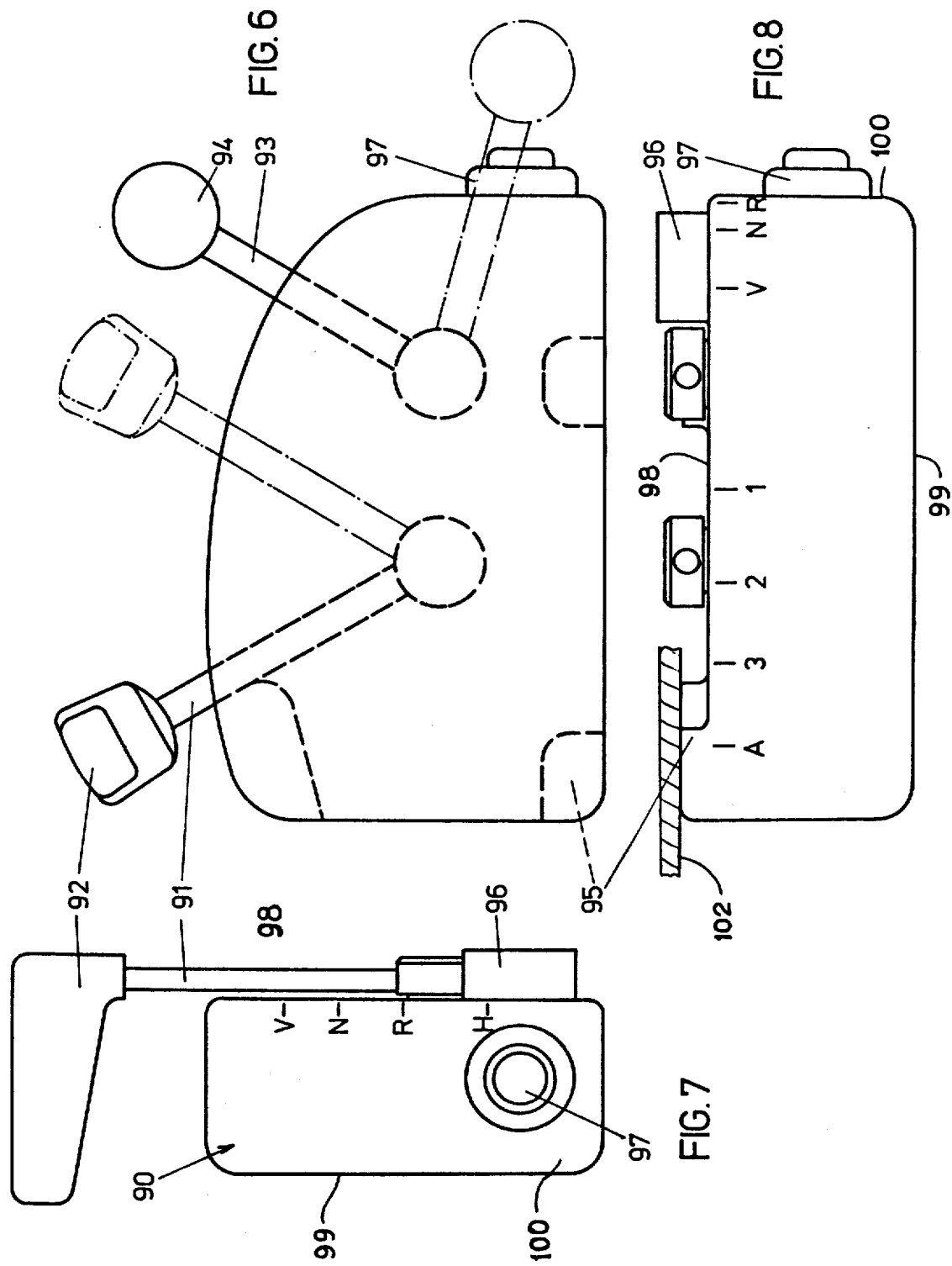

TRANSMISSION GEAR SHIFT CONTROL MECHANISM FOR HEAVY VEHICLES

This invention relates to a two lever type of sequential speed shift gear change mechanism for heavy motor vehicles of the track-laying or wheel drive type.

In gear shift control mechanisms of the foregoing type, there is always a danger of displacing the speed control lever through several of its speed positions too rapidly causing excessive increase in engine speed when shifting to lower gear ratios. To cope with this problem, a speed shift rocker arm has been proposed to cause engagement of the shift control lever by a latch mechanism in response to displacement of the control lever, the rocker arm limiting displacement of the lever for forward or reverse speed shifting with a inching movement. However, the foregoing rocker arm motion control is not suitable for all types of vehicles including, for example, special vehicles capable of cross-country travel in which the driver has to fulfill various tasks in addition to driving. In such vehicles, two control levers are provided to respectively change the gear ratio and control the direction of travel. The control levers are provided with handles of essentially different shapes so that they can be easily differentiated one from the other even by touch alone. Arrangements are made to also provide the driver with a feel for the various operative positions of the shift levers.

Also, gear shift mechanisms of the aforementioned type are provided with locks to prevent starting in case the speed of the engine is too high as well as to prevent shift into reverse when the vehicle speed is too high. In order to fulfill the foregoing requirements, a first locking device is provided in accordance with the present invention to prevent continuous displacement of the speed control lever through its several speed positions in a down-shifting direction as well as to completely prevent down-shift if engine speed is excessive. A second locking device holds the directional control lever in a neutral position and prevents its displacement to a reverse position if vehicle speed is excessive. Means is provided for momentarily releasing the second locking device under selective control.

Another feature of the invention resides in a locking disc attached to the speed control shaft as part of the first locking device. The locking disc is provided with ratchet teeth engageable by a stop pawl on a locking lever for a one-way stopping action. The disc is also yieldably held stationery in the operative positions of the speed control lever by a detent. A control disc on the speed control shaft actuates a switch in response to initial movement of the speed control lever to momentarily supply energizing current to an electro-magnetic device that effects engagement of the locking device. The switch is connected to an electric delay circuit in order to maintain the electro-magnetic device energized for a predetermined interval of short duration. Tachometers for sensing engine speed and vehicle speed, control the supply of current to the locking devices via a speed control switch to prevent shifting operation under excessive speed conditions. In another embodiment of the invention, the teeth of the locking disc on the speed control shaft are rectangular for a two-way locking action.

Another feature of the invention resides in a second locking disc attached to the shaft of the directional control lever forming part of the second locking device having a locking lever pivoted by a fixed axle and biased by an electro-magnetic device into engagement with the locking disc which is also provided with a yieldable detent. The second locking device is released for a short period of time by actuation of a push button switch connected to an electric delay circuit for this purpose.

The invention also features an electronic speed control switch operative in response to excessive engine speed and vehicle speed to prevent lock releasing operation.

Where the number of reverse speeds is less than the number of forward speeds, the present invention features means for limiting reverse control operation, including a control disc on the shaft of the directional control lever in the same plane as the switch activating control disc on the shaft of the speed control lever. A ball locking element in a support cage is provided between the two control discs and received within recesses formed on the peripheries of the discs appropriately dimensioned to restrict operation of the directional control lever to the desired number of speed ratios in reverse that are available for forward drive.

Another characteristic of the invention resides in the size and shape of the speed control lever as compared to the operating knob of the directional control lever. While the directional control lever has a ball shaped operating knob, the speed control lever has a substantially rectangular handle tapering in cross-section and extending horizontally from a lateral wall of the gear casing to which the shift control mechanism housing is attached by mounting projections spacing one side of the housing from the vehicle transmission casing. The control levers are furthermore, positioned between the housing and the side wall of the vehicle.

It is therefore, an important object of the gear shift control mechanism of the present invention to enable operation of motor vehicles in a simple and definite manner whereby one can feel the various positions of the two control levers. For cross country vehicles, the excessive speed limiting controls are particularly important. It is also possible to limit the shiftable reverse speeds with respect to the available forward speeds. The locking device for restricting down shift into lower gear ratios is advantageous in eliminating speed position hunting since the levers will encounter a firm stop when reaching each operative position. If the gear shift control mechanism is provided with a pre-selection gear change, which requires a modified electronic mechanism between the gear shift controls and the gear mechanism, the interlock between forward and reverse controls may be omitted since its function should then be assumed by the electronic mechanism to prevent undesirable gear shifting operation.

A detailed description of the invention now follows in conjunction with the appended drawings in which:

FIG. 2 illustrates a modified embodiment of the mechanism shown in FIG. 1;

FIG. 2a is a simplified circuit diagram of the electrical controls associated with the mechanism shown in FIG. 2;

FIG. 6 shows another embodiment of the gear change control mechanism in side elevation;

FIG. 7 is an end view of the mechanism shown in FIG. 6;

FIG. 8 is a top plan view of the mechanism shown in FIG. 6;

Figures 1, 1A:
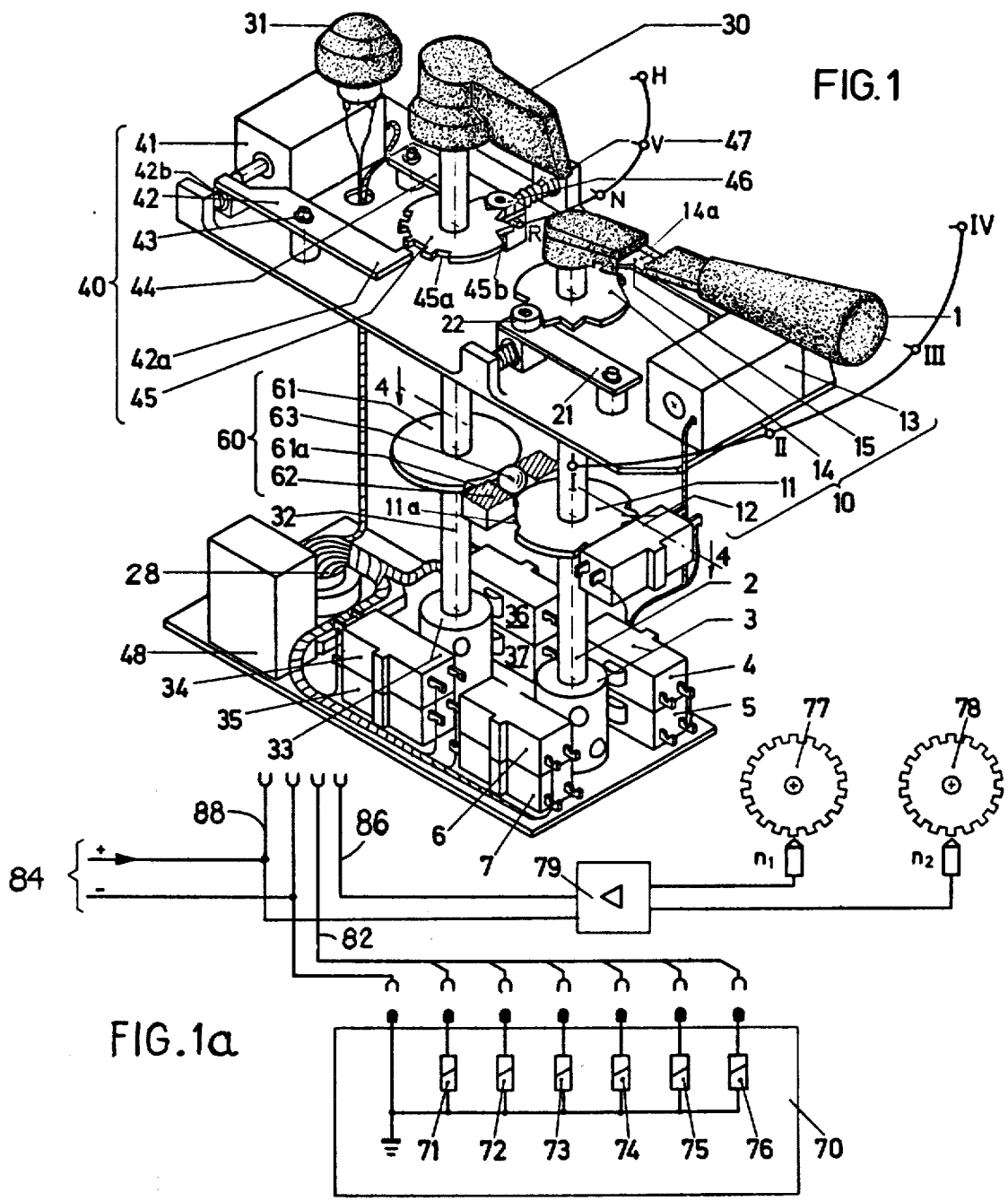
FIG. 1 is a perspective view of the assembled components of a gear change control mechanism constructed in accordance with the present invention.
FIG. 1a is a simplified circuit diagram of the electrical controls associated with the mechanism shown in FIG. 1.

Referring now to the drawings in detail, FIG. 1 shows a speed control lever 1 connected to one end of a shaft 2 on which a switch actuating cylinder 3 is mounted for actuation of switches 4, 5, 6 and 7. These switches control solenoid operated valves, 71 through 76, as diagrammatically shown in FIG. 1a, the solenoid operated valves being connected to the switches by cables 103 and 82. The solenoid operated valves act upon gear ratio controlling elements of any suitable gear transmission 70 as diagrammatically shown in FIG. 1a.

Figure 3:
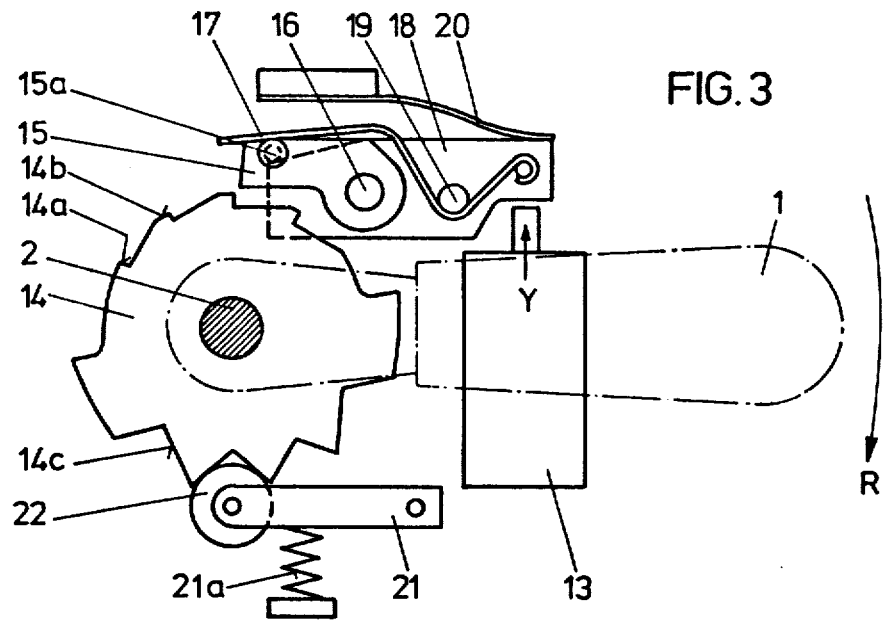
FIG. 3 is a top plan view of the locking device for the speed control lever associated with the mechanism shown in FIG. 1.
Figure 4:
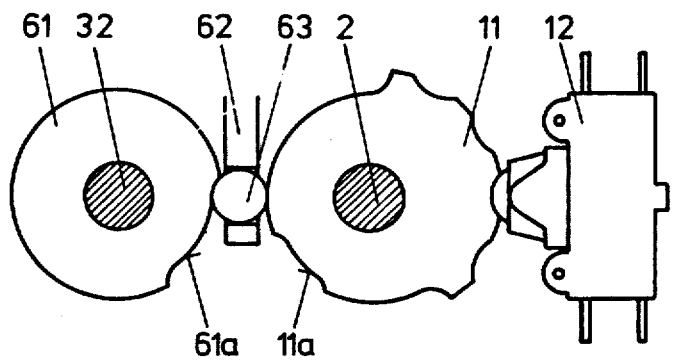
FIG. 4 is a partial sectional view taken substantially through a plane indicated by section line 4—4 in FIG. 1.

As more clearly seen in FIG. 3, the shaft 2 for the lever 1 is connected to a locking disc 14 of a first locking device 10. The disc 14 has detent stops 14c engaged by a detent roller 22 mounted on a lever 21. The lever 21 is biased by a spring 21a against the disc 14. The disc 14 also has one-way ratchet teeth 14a. A lever 18 pivotally mounted by a fixed axle 19, carries an axle 16 on which a stop pawl 15 is pivotally mounted. The pawl 15 is biased by a spring 17 in the direction of the disc 14 but is held in engagement with the lever spaced from the disc 14 by a peg 15a. A control disc 11 as more clearly seen in FIG. 4 is also attached to shaft 2 for operation of a switch 12, which controls an electro-magnetic device 13. When the lever 1 is angularly displaced in a downshifting direction as shown by arrow R in FIG. 3, the switch 12 is momentarily closed in response to initial displacement of the control disc 11 to energize the electro-magnetic device 13 causing its armature to be extended and displacing the lever 18 in a counter clockwise direction as viewed in FIG. 3 until the pawl 15 contacts one of the surfaces 14b of the disc 14. Upon continued rotation of the disc 14 by lever 1 in the direction R, the pawl 15 which remains in contact with the disc, abuts the next ratchet tooth 14a to positively halt further movement of the lever at an operational position. Prior to reaching this position, the switch 12 is opened to disconnect the current supply from the electro-magnetic device 13. However, a delay circuit 26, as more clearly seen in FIG. 5, maintains the armature of the electro-magnetic device extended for a short period of time after opening of switch 12. The delay circuit includes a resistor 26a in series with a capacitor 26b receiving current from switch 12 and supplying current for a predetermined delay period upon opening of the switch to a time-delay relay 25 through which the electro-magnetic device 13 is energized.

In FIG. 2, an alternative locking disc 24 with rectangularly developed two-way locking teeth 24a is attached to the axle 2 instead of the ratchet disc 14. A locking lever 23 is also disposed with its free end engaging the rectangular recesses on the disc 24. As a result of this embodiment, shifting is limited to one speed position at a time in both an up shifting and down shifting direction.

Referring once again to FIG. 1, a second locking device 40 is shown comprising a locking disc 45 having rectangular teeth 45a. The disc 45 is attached to a shaft 32 connected at one end to a directional control lever 30. A locking lever 42 has an end 42a engaged with the locking teeth of the disc 45, lever 42 being pivoted about a fixed axle 43. The armature of an electro-magnetic device 41 acts on the end of the locking lever 42 opposite the end 42a to hold the locking lever 42 engaged with the disc 45. A detent lever 44 with a roller 46 is biased by a spring 47 into the recesses 45b of the locking disc as a result of which precise shifting positions of the lever 30 are assured and undesirable intermittent positions are avoided.

The directional control lever 30 has positions R = reverse, N = neutral, and V = forward. When applied to a track vehicle there would be one more operative position, H for turning about a vertical axis as one tracklaying chain moves forward and the other backward, for example.

Figure 5:
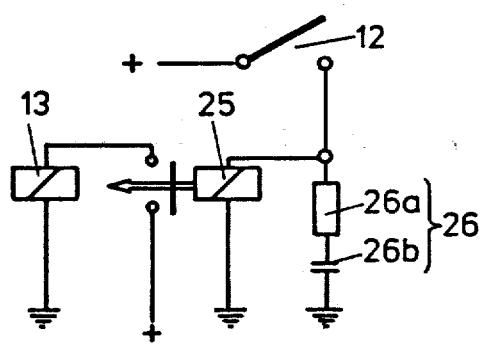
FIG. 5 illustrates a circuit diagram of the electronic delay circuit for the electro-magnetic locking device associated with the speed control lever.
Figure 9:
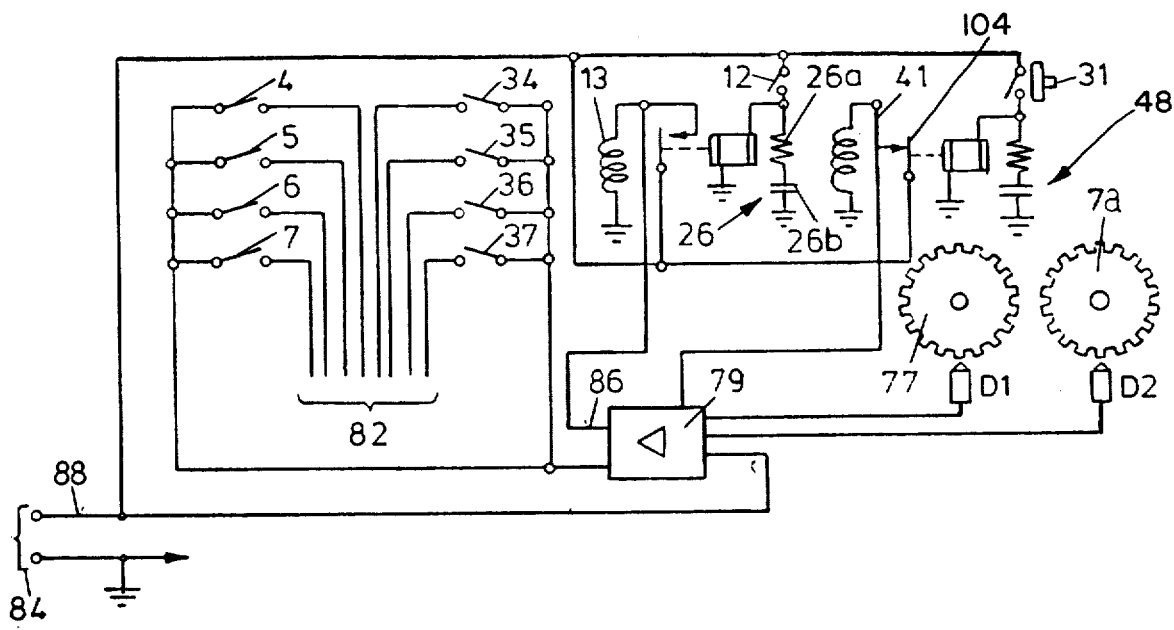
FIG. 9 is an electrical circuit diagram of the control system associated with the mechanism shown in FIG. 1.

In order to release the directional control lever 30, a push button switch 31 is actuated to provide a momentary supply of electrical current to the relay 104 associated with electromagnetic device 41 as shown in FIG. 9. Upon energization of the relay 104, its normally closed relay switch is opened to deenergize electromagnetic device 41, whereby its armature releases the locking lever 42 so that it may be displaced by spring 42b to a release position shown in FIG. 1 disengaging the locking disc 45 and lever 30. Upon actuation of the push button switch 31, an electrical delay circuit 48 similar to the delay circuit 26 hereinbefore described in connection with FIG. 5, is also activated in order to time the period during which the relay 104 for the electromagnetic device 41 is maintained energized and the locking device 40 released. The switch 31 is, however, rendered ineffective to release locking device 40 when the vehicle speed is excessive, as will be explained hereafter.

Since the drive shaft of a plural speed gear transmission may be driven in both rotational directions, a reverse interlock mechanism 60 is provided if there are less reverse speeds than forward speeds. The reverse interlock mechanism includes a control disc 61 fixed to shaft 32 in coplanar relation to the control disc 11. The control disc 61 is provided with an arcuate recess 61a as more clearly seen in FIG. 4. The angular extent of the recess 61a corresponds to a switching angle between positions N and R of lever 30 plus the diameter of an interlock ball 63. The ball 63 is supported between the two control discs 11 and 61 by a ball cage 62 and serves as a locking element. The control disc 11 previously described in connection with the actuation of switch 12, is also provided with an arcuate recess 11a having an angular extent corresponding to the switching angle of the shiftable reverse gears plus the diameter of the ball 63. When the control lever 30 is in the neutral position N, the ball 63 is at one end of the recess 61a of the control disc 61 and abuts against the outer peripheral edge of the control disc 11 as shown in FIG. 4. When lever 30 is in position R the ball 63 contacts the outer peripheral edge of the control disc 61 while it occupies the recess 11a of the control disc 11.

A switch actuating cylinder 33 is connected to one end of the shaft 32 opposite the directional control lever 30 for actuating switches 34, 35, 36 and 37 to control selection of reverse speed ratios through the solenoid operated valve devices 71–76 connected to the latter switches through cable 82. A plug socket 28 is provided for electrically connecting the conductors in cable 82 from the solenoid operated valves 71–76 to the switches 4–7 and 34–37 and to a source of voltage 84 as shown in FIGS. 1a and 9. The source 84 is also connected through an electronic speed control switch 79 and conductors in cable 86 to switches 4–7 and device 41 by way of the plug socket 28. The electronic speed control switch 79 is controlled by a pulse counter 77 operatively connected to the engine shaft so that starting of the vehicle is prevented if the engine speed is too high by interrupting the supply of current to the switches 4–7 and 34–37. The switch 79 is also controlled by a pulse counter 78 operatively connected to the output of the vehicle transmission to block displacement of the directional control lever 30 in case vehicle speed is too high by maintaining electromagnetic device 41 energized. Further, by maintaining the electromagnetic device 13 energized, downshift movement of the lever 1 is prevented when vehicle speed is excessive. The electronic control 79 is of a type wherein pulse signals reflecting rotational speed information are operative to perform various functions when a preset threshold is exceeded. The details of such electronic controls form no part of the present invention and are well known, for example, in anti-lock brake control systems as disclosed in U.S. Pat. No. 3,679,894 to Smith.

Accordingly, the electromagnetically controlled locking devices 10 and 40 will prevent operation of the operating levers 1 and 30 of the gear shift control mechanism under undesirable speed conditions. Since the gear shift control mechanism is used essentially in vehicles for cross-country travel, for example, for trucks, etc., the shape of its control levers, and its housing are of great importance in addition to its operation as hereinbefore described.

Figure 10:
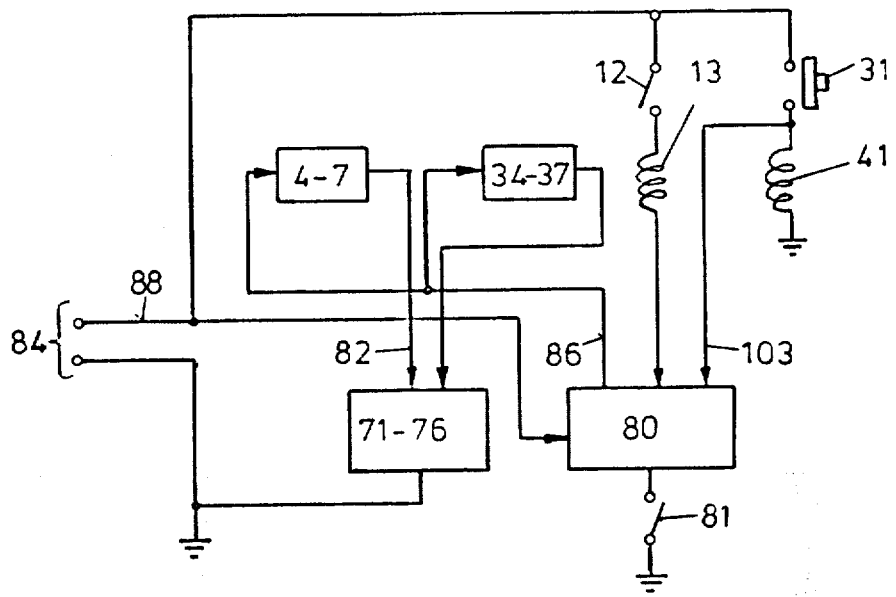
FIG. 10 is a simplified electrical circuit diagram illustrating the system associated with the mechanism shown in FIG. 2.

For a vehicle equipped with automatic shifting means, the shift control system of FIG. 1 is somewhat modified and an electronic system 80 is utilized as shown in FIG. 2, in place of the electronic speed control switch 79 shown in FIG. 1. This electronic unit is controlled by the pulse counters 77 and 78 for engine speed and vehicle speed, just like the speed switch 79. The electronic unit 80 also contains delaying circuits for the two electromechanical device 13 and 41 to which it is connected as diagrammed in FIGS. 2a and 10. Also, the reverse interlock mechanism 60 can be omitted since its function will be assumed by the electronic unit 80. A kick-down switch 81 operated in a known manner through the accelerator gas pedal, is also connected to the electronic unit 80 to cause automatic downshift. An automatic operational position A for lever 1 is denoted at the fourth gear ratio position in FIG. 2. The vehicle can then be driven in the first three gear speeds even if the unit 80 is omitted.

FIGS. 6 to 8 show an embodiment in which a housing 90 is relatively thin in width and has lateral feet 95 by means of which the shift control mechanism can be attached to a side wall 102 of a vehicle gear transmission casing leaving sufficient space between this side wall and the housing 90 for a speed control lever 91 and a directional control lever 93. The angles between the operative positions of the control levers should be sufficiently large so that these positions can be recognized by feel. The levers 91 and 93 must also be clearly differentiated from each other by shape and size in order to avoid any confusion between them. The lever 91 in the illustrated embodiment has a handle 92 with an essentially rectangular and tapering cross-sectional shape projecting laterally into the driver's cabin. The lever 93, on the other hand, has a ball shaped knob 94. The wall 98 of the housing 90 facing the driver is entirely smooth. A push button switch 97 for unlocking the lever 93 is attached to the narrow end wall 99 of the housing 90 and projects perpendicularly therefrom rearwardly of the wall 100 of the housing facing the side wall of the vehicle gear casing. The side wall 100 is provided with a plug socket 96 for electrical connections as hereinbefore described in connection with FIGS. 1 and 2.

We claim:

1. In a drive ratio control mechanism for a vehicle having a pair of control devices respectively controlling output speed of a gear transmission and direction of movement of the vehicle in response to displacement of the control devices to a plurality of operative positions, first locking means engageable with one of the control devices for preventing continuous displacement thereof through said operative positions, second locking means engageable with the other of the control devices for preventing displacement thereof from one of the operative positions, selectively controlled means for momentarily releasing the second locking means to permit displacement of the other of the control devices from said one of the operative positions, and speed controlled means for preventing release of said second locking means.

2. The combination of claim 1 wherein said first locking means includes a locking disc connected to said one of the control devices, detent means engageable with the locking disc for yieldably holding said one of the control devices in each of the operative positions, stop means rendered operative to engage the locking disc for limiting displacement of said one of the control devices and switch means responsive to displacement of said one of the control devices for temporarily rendering the stop means operative.

3. The combination of claim 2 wherein the locking disc is provided with one-way ratchet teeth engageable by the stop means to limit displacement of said one of the control devices in a downshifting direction.

4. The combination of claim 3 wherein said second locking means includes a second locking disc connected to the other of the control devices, biased means engageable with the second locking disc for holding the other of the control devices in each of the operative positions thereof, said selectively controlled means including electromechanical means for disengaging the biased means from the second locking disc when energized, and delay circuit means for limiting said energization of the electromechanical means to a period of short duration.

5. The combination of claim 4 wherein said speed controlled means includes a pair of rotation counting devices for respectively measuring engine and vehicle speeds.

6. The combination of claim 5 including reverse interlock means connected to the control devices for limiting the number of drive ratios selected by said one of the control devices in another of the operative positions of the other of the control devices.

7. The combination of claim 6 wherein said switch means includes a switch actuating disc having actuating formations thereon, a switch device actuated by said formations in response to displacement of said one of the control devices for momentarily operating the stop means, and delay means connected to the switch device for maintaining the stop means operative for a predetermined period of short duration.

8. The combination of claim 7 wherein said reverse interlock means includes a control disc connected to the other of the control devices in coplanar relation to said switch actuating disc, a ball element supported between said coplanar discs, each of said discs having a peripheral edge formed with an arcuate recess, the radial spacing between the peripheral edge of one of the discs and the arcuate recess in the other of the discs being substantially equal to the diameter of the ball element, the angular extent of said arcuate recesses corresponding to the number of the drive ratios in reverse drive selected by displacement of said one of the control devices.

9. The combination of claim 8 wherein said control devices include levers having handle formations thereon of different size and shape.

10. The combination of claim 9 including a housing enclosing the control mechanism in spaced relation to a wall of the gear transmission the handle formation on one of the levers being ball-shaped while the formation on the other of the levers being of substantially tapering cross-section extending laterally away from the wall of the gear transmission.

11. The combination of claim 10 including spacing formations on one side of said housing through which the housing is connected to said wall of the gear transmission.

12. The combination of claim 11 wherein said levers are disposed between said one side of the housing and the wall of the gear transmission.

13. The combination of claim 2 wherein the locking disc is provided with two-way locking teeth engageable by the stop means to prevent displacement in both downshifting and upshifting directions.

14. The combination of claim 2 wherein said second locking means includes a second locking disc connected to the other of the control devices, biased means engageable with the second locking disc for holding the other of the control devices in each of the operative positions thereof, said selectively controlled means including electromechanical means for disengaging the biased means from the second locking disc when energized, and delay circuit means for limiting said energization of the electromechanical means to a period of short duration.

15. The combination of claim 2 wherein said switch means includes a switch actuating disc having actuating formations thereon, a switch device actuated by said formations in response to displacement of said one of the control devices for momentarily operating the stop means, and delay means connected to the switch device for maintaining the stop means operative for a predetermined period of short duration.

16. The combination of claim 15 including reverse interlock means connected to the control devices for limiting the number of drive ratios selected by said one of the control devices in another of the operative positions of the other of the control devices.

17. The combination of claim 16 wherein said reverse interlock means includes a control disc connected to the other of the control devices in coplanar relation to said switch actuating disc, a ball element supported between said coplanar discs, each of said discs having a peripheral edge formed with an arcuate recess, the radial spacing between the peripheral edge of one of the discs and the arcuate recess in the other of the discs being substantially equal to the diameter of the ball element, the angular extent of said arcuate recesses corresponding to the number of the drive ratios in reverse drive selected by displacement of said one of the control devices.

18. The combination of claim 1 wherein said speed controlled means includes a pair or rotation counting devices for respectively measuring engine and vehicle speeds.

19. The combination of claim 1 including reverse interlock means connected to the control devices for limiting the number of drive ratios selected by said one of the control devices in another of the operative positions of the other of the control devices.

20. The combination of claim 1 wherein said control devices include levers having handle formations thereon of different size and shape.

21. The combination of claim 20 including a housing enclosing the control mechanism in spaced relation to a wall of the gear transmission, the handle formation on one of the levers being ball-shaped while the formation on the other of the levers being of substantially tapering cross-section extending laterally away from the wall of the gear transmission.

22. The combination of claim 21 including spacing formations on one side of said housing through which the housing is connected to said wall of the gear transmission.

23. The combination of claim 22 wherein said levers are disposed between said one side of the housing and the wall of the gear transmission.

24. The combination of claim 1 including a housing enclosing the control mechanism in spaced relation to a wall of the gear transmission, said control devices including levers disposed between the housing and the wall having handle formations of different size and shape.

* * * * *